United States Patent Office 3,594,362
Patented July 20, 1971

3,594,362
UREA COMPLEXES
Karoly Szabo, Orinda, Calif., assignor to Stauffer
Chemical Company, New York, N.Y.
No Drawing. Filed Mar. 17, 1964, Ser. No. 352,637
Int. Cl. C36 127/14, 16, 18, 20
U.S. Cl. 260—96.5                    19 Claims

ABSTRACT OF THE DISCLOSURE

This invention relates to chemical complexes of urea or urea derivatives with a completely halogenated acetone and to their preparation. The invention is also concerned with fungicidal and herbicidal compositions containing as the active component thereof at least one of the aforesaid complexes.

---

The present invention contemplates a new class of compounds which were discovered as the reaction product formed from the chemical combination of urea or a derivative thereof with a fully halogenated acetone in which the halogen atoms are fluorine or a combination of fluorine and chlorine, it being understood that at least three fluorine atoms are present in the fully halogenated ketone. Although their structure has not as yet been fully elucidated, the compounds are apparently addition complexes in which the proportion of urea adduct to the halogenated acetone is in the ratio of small whole numbers. Pointing to the aforesaid structural hypothesis is the fact that the formation of the complexes is not accompanied by secondary products as is characteristic of metathetical and substitution reactions. That the addition complexes are distinct entities having a definite chemical composition is supported by the consistent analytical data and sharp melting points of the purified products. The chemical configuration of the complexes as contemplated herein are deemed to be formalistically depicted by the following formula:

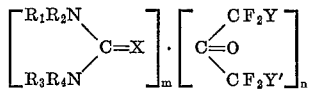

wherein $R_1$, $R_2$, $R_3$ and $R_4$ designate hydrogen, a hydrocarbon residue having from 1 to 8 carbon atoms, such as an aliphatic radical, e.g. methyl, ethyl, chloroethyl, bromoethyl, hydroxyethyl, n-propyl, chloro-n-propyl, n-butyl, isobutyl, sec.-butyl, n-amyl, isoamyl, sec.-amyl, n-hexyl, isohexyl, n-heptyl, n-octyl, isooctyl, allyl, vinyl, methylallyl, i-butenyl, propynyl, etc., and a phenyl radical in which said hydrocarbon residue can be substituted by lower alkyl, lower alkoxy, halogen such as fluorine, chlorine or bromine and amino, it being understood that the amino groups of the urea may exist as their carbazides and semi-carbazides or the corresponding carbazones, semi-carbazones and Schiff bases thereof, while taken together any 2 members of $R_1$, $R_2$, $R_3$, $R_4$ can form a 5 to 6 membered heterocyclic ring system having at least 2 carbon atoms such as imidazoline; X is a chalcogen such as oxygen or sulfur, Y and Y' are selected from the class consisting of chlorine and fluorine and $m$ and $n$ are integers of from 1 to 3, it being understood that $m$ and $n$ are unity when their numerical values are identical.

In general, it has been our finding that the halogenated acetone is capable of undergoing complex formation with any particular urea derivative of the type described in the general formula provided it is not sterically hindered or crowded by bulky substituents. We have also ascertained that at least 1 of the amino nitrogen atoms should be free of a phenyl or larger aryl radical.

As will be noted from an inspection of the general structural formula, the new derivatives can be regarded as simple addition complexes wherein the ratio of reactants is that of small whole numbers. In the great majority of cases, the complexes are well defined, crystalline solids exhibiting sharp melting points. Although they undergo dissolution in the common organic solvents the complexes are more often insoluble in water. It is, of course, possible to alter the aqueous solubility by forming complexes in which the urea component is provided with a highly polar substituent or a salt forming group such as a sulfo or carboxylic acid function. In fact, by giving attention to the particular urea component, one can generally control or regulate the solubility of the complex obtained therefrom.

Typical urea derivatives which undergo reaction with the completely halogenated acetones as described herein are formalistically depicted below. Other exemplary ureas are spelled out in the appended examples to be subsequently described.

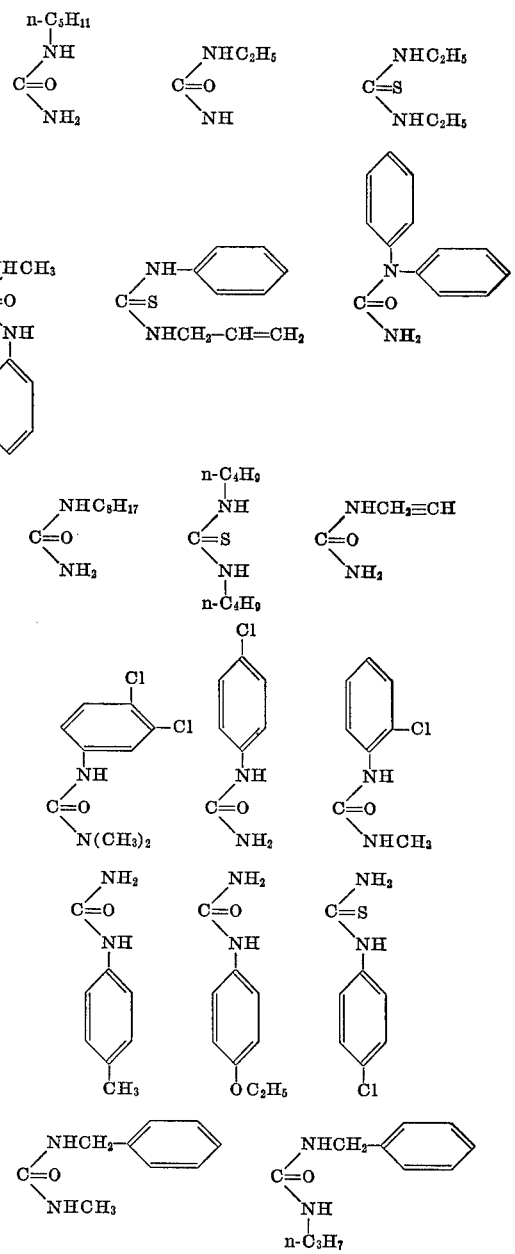

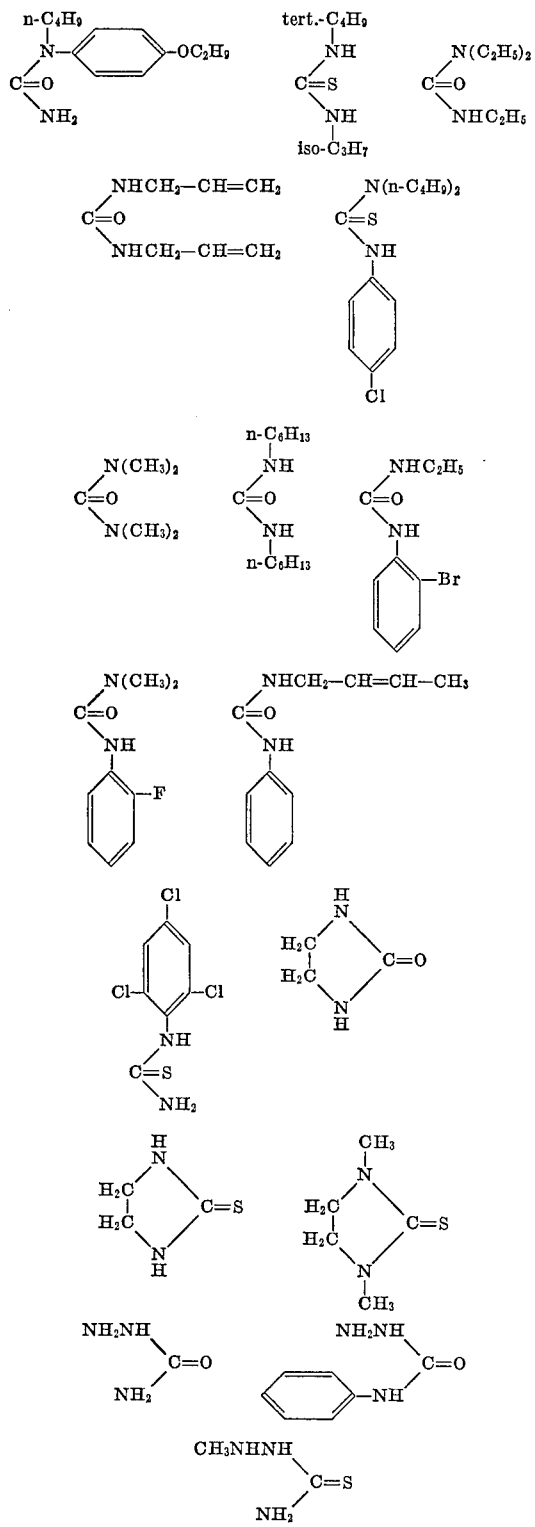

and

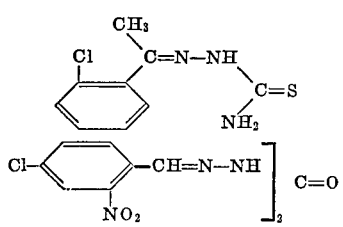

In preparing the chemical complexes of the invention, the chlorofluoroacetone and urea components are brought together and in many instances there ensues a simultaneous and exothermic reaction. The vigor of the reaction is apparently a function of the particular urea, it having been observed that the more complex members exhibit a diminished tendency to undergo complex formation. In general, it has been our finding tha the reaction can be satisfactorily controlled by regulating the temperature with or without the use of solvents. For instance, the more energetic ureas are preferably reacted with the halogenated acetone in the presence of a liquid diluent while resorting, if necessary, to external cooling. In the case of the more sluggish ureas, mildly elevated temperatures are recommended while at the same time reducing the quantity of solvent or eliminating it entirely. A particularly convenient procedure which has been found to give excellent results consists in refluxing the halogenated ketone and urea component in the presence of a normally liquid, relatively inert organic solvent and in this connection, the lower saturated aliphatic ketones have proven especially efficacious. Other suitable solvents include the liquid aromatic and saturated aliphatic hydrocarbons as well as their liquid chlorinated derivatives, lower saturated aliphatic ethers, esters, alcohols and the like.

As previously pointed out elsewhere herein, the ratio of the urea reactant and the chlorofluoroacetone is that of small whole numbers. Consequently, it is possible to obtain more than one complex from the same component. For instance, dimethyl urea and sym.-dichlorotetrafluoroacetone react to produce a complex wherein the ratio of the reactants is one to one. On the other hand, by employing an excess of the dimethyl urea, there is obtained a complex consisting of two moles of the urea reactant and one mole of the halogenated ketone. It has, moreover, been ascertained that the biological activity can be controlled or regulated within certain limits by adjusting the molar ratio of urea and chlorofluoroacetone as above described and this constitutes another valuable and unexpected aspect of the invention. Thus, while a 1:1 ratio complex of urea and halogenated ketone yields a class of compounds characterized by fungicidal activity, the 1:2 complex on the other hand turns out to be more valuable for producing compounds having selective herbicidal activity. This added flexibility with respect to their chemical makeup greatly increases the biological applications of our comopunds.

Although the complexes of the invention are generally active as fungicides, it has been discovered that they are also effective as systemic toxicants and this ancillary feature greatly increases their usefulness and versatility in treating fungus infected food crops. As those skilled in the art are aware, a systemic biocide is taken up internally by the organism to which it is applied and lodges in the tissues while still retaining toxicological properties. When used to protect food crops systemic toxicants are not subject to weathering since they are confined within the interstices of the plant tissues which are thereby internally immunized against the attack of harmful fungi, blights and similar pesticidal microoragnisms.

The invention is further illustrated by reference to the following examples. It will be understood, however, by those skilled in the art to which the said invention pertains that various modifications and ramifications can be effected without departing from the spirit and scope of the said invention.

EXAMPLE 1

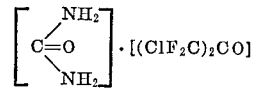

12.0 g. of urea was suspended in 70 ml. of acetone and to this mixture was gradually added 40.0 g. of sym.-dichlorotetrafluoroacetone. There resulted an exothermic reaction with concomitant dissolution of the urea. After addition of the halogenated ketone which required twenty minutes, the reaction mixture was stirred for an additional thirty minutes after which the solvent was removed by distillation. The residue became crystalline after removal of volatile components and was triturated with a small amount of methylene dichloride and then separated by filtration. The purified product melted at 113° C. and the yield was 31 g.

EXAMPLE 2

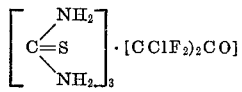

Using the procedure as described under Example 1, 20.0 g. sym.-dichlorotetrafluoroacetone was added to a mixture of 7.6 g. of thiourea suspended in 70 ml. of acetone. The introduction of the halogenated ketone produced a slight exothermic reaction. There was obtained a yield of 10.5 g. of a slightly yellow, crystalline product. Chemical and instrumental analysis was in conformity with the above depicted structure.

EXAMPLE 3

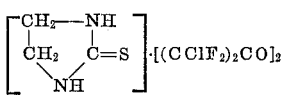

A mixture consisting of 20.0 g. of sym.-dichlorotetrafluoroacetone, 10.2 g. of 2-imidazoline thione and 80 ml. of acetone was refluxed for a period of 4 hours. The mixture was then subjected to vacuum distillation to remove volatile components and solvent and the oily residue added to water. The heavy, oily layer was extracted with benzene and the benzene extracts dried over anhydrous magnesium sulfate. After filtering off the desiccant, the organic solution was distilled to remove the benzene. There was obtained a residue of reddish oil having an $N_D^{25}$ of 1.4613.

EXAMPLE 4

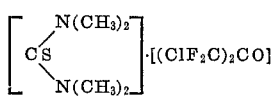

10.0 g. of tetramethylthiourea was dissolved in 50 ml. of benzene to which was added a molar equivalent of sym.- dichlorotetrafluoroacetone and the mixture allowed to stand overnight at room temperature. After removing the solvent by vacuum distillation, there was obtained a residual, dark brownish oily product having an $N_D^{25}$ of 1.4832. The yield amounted to 15.0 g.

EXAMPLE 5

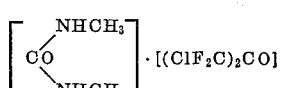

The above depicted complex was obtained by reacting dimethylurea with sym.-dichlorotetrafluoroacetone in a molar ratio of 2:1. There was isolated a white, crystalline solid melting at 50° C.

EXAMPLE 6

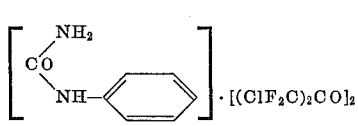

o.8 g. of phenyl urea, 20.0 g. of sym.-dichlorotetrafluoroacetone and 40 ml. of acetone were combined whereby there ensued a mildly exothermic reaction. The mixture was allowed to remain at room temperature for ten minutes after which the solvent and volatile components were boiled off by heating to 52° C. for a period of twelve minutes. There was obtained a viscous, yellow oil which gradually solidified on standing. The crude product was triturated with benzene and the resulting white solid removed by filtration. The purified product melted at 138° C.

EXAMPLE 7

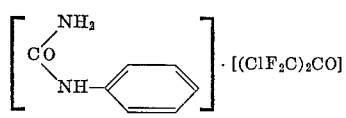

The above depicted complex was prepared in accordance with the procedure of Example 6 but using twice the quantity of phenyl urea. The purified product was a white, crystalline solid melting at 93° C. with decomposition and having a chemical configuration as above shown.

EXAMPLE 8

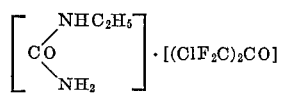

8.8 g. of ethylurea, 20.0 g. of sym.-dichlorotetrafluoroacetone and 70 ml. of benzene were combined whereby there ensued a slightly exothermic reaction with concomitant dissolution of the urea. After standing at room temperature overnight, the reaction mixture was subjected to vacuum distillation to remove solvent and volatile components. The product was isolated in the form of a colorless oil having an $N_D^{25}$ of 1.4310. The yield was 28.0 g.

EXAMPLE 9

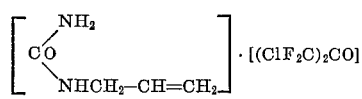

This compound was prepared in accordance with the procedure as given for Example 8. The product was a white, crystalline, hygroscopic solid, the melting point of which was 74° C.

EXAMPLE 10

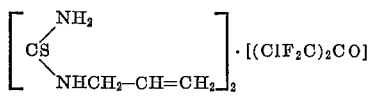

The preparation of the above depicted compound was patterned after the procedure set forth in Example 8 but using equivalent quantities of allyl thiourea and sym.-dichlorotetrafluoroacetone. The product obtained in this case was a slightly yellow solid melting at 56° C.

EXAMPLE 11

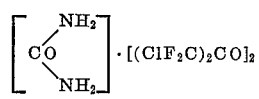

9 g. (0.15 M) of urea was slowly added to a mixture of 70.0 g. of sym.-dichlorotetrafluoroacetone in 100 ml. of acetone while maintaining thorough agitation. After the originally exothermic reaction had subsided, stirring and refluxing was continued for a period of 1.5 hrs. At the end of this period, the solvent and volatile materials were removed by vacuum distillation and a viscous, yellowish, oil was isolated. The yield amounted to 69 g. and the $N_D^{25}$ of the product was 1.4250.

Following generally the procedure of the previous examples, the following urea complexes with sym.-tetrachlorodifluoroacetone were prepared:

EXAMPLE 12

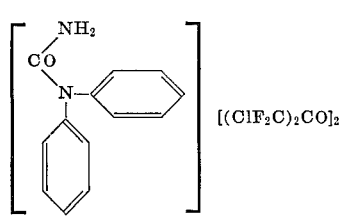

Pale yellow oil; $N_D^{25}$ 1.4878.

EXAMPLE 13

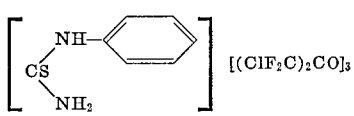

Yellow, mobile oil; $N_D^{25}$ 1.4838. Yield quantitative.

EXAMPLE 14

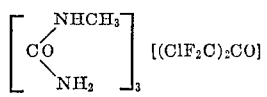

M.P. 91° C.

EXAMPLE 15

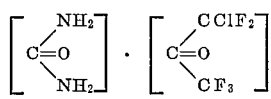

3.0 g. of urea was suspended in 50 ml. of acetone and to the resulting suspension was slowly added 10.0 g. of chloropentafluoroacetone. After the moderately exothermic reaction had subsided, the reaction mixture was subjected to distillation in vacuo and the desired product was obtained as a colorless oil residue having a refractive index of 1.4075 at 25° C. The analysis of the product was in consonance with the above depicted configuration.

EXAMPLE 16

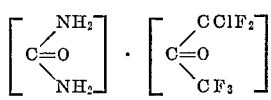

This preparation was carried out using the procedure of Example 15 except that the urea was replaced by its thiourea analog. A crystalline product was obtained which melted sharply at 158° C.

EXAMPLE 17

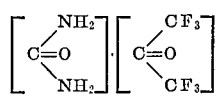

This preparation was carried out in accordance with the procedure given for the previous examples but using hexafluoroacetone as the halogenated ketone adduct. The product was obtained as a white crystalline solid, melting at 115° C.

EXAMPLE 18

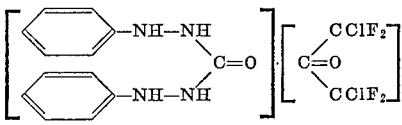

6.05 g. of 1,5-diphenylcarbohydrazide and 10.0 g. of sym.-dichlorotetrafluoroacetone were reacted in the presence of 50 ml. of acetone while following the general procedure as set forth in Example 15. The product was purified by triturating with methylene dichloride. The purified material was a crystalline white solid having a decomposition point of 75° C.

EXAMPLE 19

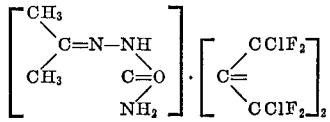

A mixture of 5.8 g. of acetone semicarbazone, 10.0 g. of sym.-dichlorotetrafluoroacetone and 50 ml. of acetone were refluxed for a period of 2½ hours. After the mixture had cooled to room temperature, a small quantity of unreacted starting material was filtered off and the filtrate subjected to distillation in vacuo to remove volatile components. The product was obtained as a residual colorless oil having a $N_D^{25} = 1.4487$; the yield amounted to 7.5 g.

EXAMPLE 20

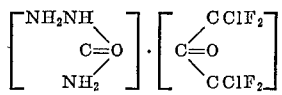

5.57 g. of semi-carbazide hydrochloride was refluxed in a solution of 5.05 g. of triethylamine in 50 ml. of acetone for 10 minutes. The triethylamine hydrochloride was removed by filtration and the filtrate containing the free semicarbazide was reacted with 10.0 g. of sym.-dichlorotetrafluoroacetone. After the exothermic reaction had subsided the mixture was agitated for 1 hour after which the solvent and volatile components were removed by distillation in vacuo. The product was obtained as a light brown oily residue having an $N_D^{25}$ of 1.4188. The yield amounted to 14.0 g.

EXAMPLE 21

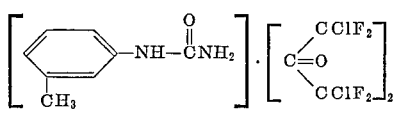

The above depicted complex was prepared in accordance with the procedure given for Example 15. The product was obtained in the form of a viscous yellow oil having a refractive index of 1.4723 at 25° C.

EXAMPLE 22

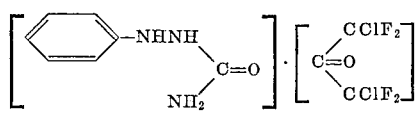

7.5 g. of phenyl semi-carbazide was suspended in a solution of 10.0 g. of sym.-dichlorotetrafluoroacetone in 30 ml. of acetonitrile whereby there occurred a mildly exothermic reaction with concomitant dissolution of the phenyl semi-carbazide. After the removal of solvent and volatile components the product was obtained in the form of a crystalline solid.

EXAMPLE 23

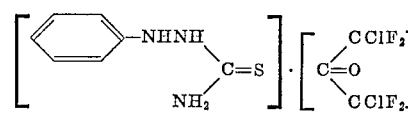

The above depicted complex was obtained by following the procedure as set forth in Example 15.

EXAMPLE 24

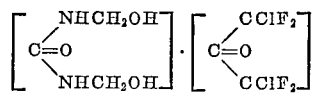

20.0 g. of sym.-dichlorotetrafluoroacetone was gradually added to a well stirred slurry of 1,3-bis(hydroxymethyl) urea in 75 ml. of acetone. After the initially exothermic reaction had subsided refluxing was continued for 2 hours during which period all of the urea component underwent dissolution. The product was isolated by distilling off the solvents and volatile in vacuo and the semi-solid oily residue purified by crystallization from methylene dichloride. The purified material melted sharply at 230° C. and the chemical and instrumental analysis were in consonance with the above depicted configuration.

In using the compounds of the invention, preparations suitable for fungicidal and herbicidal applications may be compounded in the form of dusts or sprays. For instance, a dusting powder is formulated by intimately blending the halogenated acetone urea complex with a finely divided solid carrier of which talc, diatomaceous earth, pyrophyllite, hydrated silica, clay and bentonite are typical examples. The active component normally comprises about 1 to 15% of the total mixture. Moreover, it is a common practice to employ wetting agents to facilitate dispersing the active material in the event the dusts are added to water. Typically, a wettable powder may comprise 20 to 50% of the complex, 45 to 75% of one of the aforementioned finely divided solids, and 1 to 5% of a wetting agent. The aforesaid mixtures can be further diluted if desired. Exemplary wetting agents are the sodium alkylbenzenesulfonates, sodium dodecyl sulfate, and the nonionic polyethers as exemplified by the alkylphenoxypolyethoxyethanols. In use, the wettable powder is stirred up in water and the resultant liquid sprayed on plants for protection against fungus diseases. Another common procedure for incorporating the toxicants of the invention in a form suitable for application to plants consists of dissolving the toxicant in an organic solvent such as xylene, toluene, ethylenedichloride followed by emulsifying the resulting solution in water in the presence of a dispersing agent. The solvent solution can also be applied directly.

In carrying out systemic fungicidal tests, 60 ml. of a solution containing the compound undergoing evaluation was diluted until the concentration was 50 parts per million and the resultant diluted solution then placed in small tubes. A pinto bean plant was inserted in each tube using a cotton plug to support the seedling and also to retard evaporation. After 48 hours, two plants were inoculated with bean rust. Comparison between the treated and untreated plants was then made and the results evaluated.

The fungicidal and herbicidal activity of the compounds of the invention are illustrated by the various test data summarized in Tables I and II in which the fully halogenated acetone is sym.-dichlorotetrafluoroacetone.

TABLE I.—HERBICIDAL ACTIVITY

| Sym.-dichlorotetrafluoroacetone complexed with— | Ratio of halogenated acetone to urea | Pre, 20 lbs/acre [1] | Post/ 12 lbs, acre [2] |
|---|---|---|---|
| Urea | 1:1 | 20 | 15 |
| Thiourea | 1:1 | 17 | 8 |
| Urea | 1:2 | 21 | 18 |
| Tetramethyl thiourea | 1:1 | 12 | 18 |
| Methyl thiourea | 1:1 | 15 | 14 |
| s-Dimethyl urea | 1:1 | 21 | 17 |
| Phenyl urea | 1:2 | 21 | 12 |
| Ethyl urea | 1:1 | 20 | 12 |
| Allyl urea | -- | -- | 15 |
| Allyl thiourea | 1:1 | 17 | 7 |
| s-Dimethyl urea | 1:2 | 14 | 12 |
| 1,1-dimethyl-3-(3,4-dichlorophenyl) urea | 1:1 | 21 | 18 |

[1] 21=Complete control of 7 weed species.
[2] 18=Complete control of 6 weed species.
NOTE.—Pre=preemergent herbicidal activity; post=post emergent herbicidal activity.

TABLE II.—PLANT DISEASE CONTROL BY UREA AND THIOUREA ADDUCTS WITH SYM.-DICHLOROTETRAFLUOROACETONE

| Adduct | Foliage screen (p.p.m.) | | | | | | Weathering test (p.p.m.) | | | | Rust eradication (p.p.m.) | | Tube sys. (p.p.m.) | | Soil drench (p.p.m.) | |
|---|---|---|---|---|---|---|---|---|---|---|---|---|---|---|---|---|
| | Rust | | | Mildew | | | Rust | | Mildew | | Rust | Mildew | Rust | Mildew | Rust | Mildew |
| | 1,000 | 500 | 100 | 1,000 | 500 | 100 | 1,000 | 500 | 1,000 | 500 | 1,000 | 500 | | | | |
| Urea | 100 | 100 | 0 | +++ | + | 0 | d 100 | d 100 | d 100 | d 100 | d 100 | ++++ | *1 | 10 | 0.375 | d *3 |
| Urea | -a | -a | b 0 | -a | b +++ | b + | d 100 | d 100 | d 100 | d 100 | | | c 5 | >5 | >6 | |
| s-Dimethyl urea | d 100 | d 100 | ++++ | c 0 | d 0 | + | d 100 | d 100 | d 100 | ++ | | | d 5 | | d 3 | |
| s-Dimethyl urea (1:2) | b 100 | c 100 | ++++ | c 0 | b 0 | d 0 | d 100 | d 100 | d 100 | +++ | | | *50 | *50 | | |
| Ethyl urea | 100 | 100 | ++++ | d 0 | + | 0 | c 100 | d 100 | c 100 | +++ | 100 | ++++ | d 10 | d 50 | 1.5 | |
| Allyl urea | 100 | 100 | ++++ | d 0 | ++ | 0 | d 100 | d 100 | d 100 | +++ | 100 | ++++ | *10 | d 25 | 1.5 | |
| Phenyl urea | d 100 | ++++ | ++++ | ++++ | ++++ | + | ++++ | + | c 100 | ++++ | 0 | 0 | c 25 | c .25 | | |
| Phenyl urea (1:2) | d 100 | d 100 | ++++ | d 100 | ++++ | + | d 100 | d 100 | b 100 | ++++ | d 100 | ++++ | d *10 | d *10 | *0.75 | |
| 1,1-Diphenyl urea | d 100 | d 100 | ++++ | c 100 | ++++ | 0 | c 100 | c 100 | c 100 | +++ | d 100 | ++++ | c *10 | c *10 | d 6 | |
| Thiourea | 100 | 100 | ++++ | d 100 | ++ | 0 | d 100 | d 100 | d 100 | +++ | d 100 | ++ | *1 | >50 | *1.5 | |
| Methyl thiourea | d 100 | d 100 | ++++ | c 0 | d 0 | 0 | c 100 | d 100 | c 100 | +++ | d 100 | ++++ | 5 | b 25 | 3 | |
| Tetramethyl thiourea | -a | -a | b ++ | b ++++ | ++++ | c 0 | -a | c 100 | -a | ++++ | c 100 | ++++ | 5 | >5 | d *3 | |
| Allyl thiourea | d 100 | d 100 | 100 | d 0 | 0 | 0 | 100 | 100 | 100 | ++++ | 100 | ++++ | d *10 | d 50 | 3 | |

*=lowest rate tested. d=slight injury. c=moderate injury. ++++=90% control. ++=40% control.
b=severe injury. -a=plant killed. >=greater than. +++=75% control. +=10% control.

I claim:
1. A complex of a fully halogenated acetone with a urea and having the formula

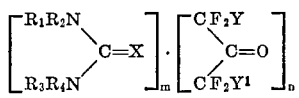

wherein $R_1$, $R_2$, $R_3$ and $R_4$ are selected from the group consisting of hydrogen, lower alkyl, lower alkenyl, lower hydroxy-alkyl, phenyl and substituted phenyl wherein said substituents are lower alkyl, chlorine, fluorine, bromine, nitro, amino, and lower alkoxy, it being provided that only one of the urea amino groups carry a phenyl substituent; X is a member selected from the group consisting of oxygen and sulfur, Y and $Y^1$ are halogens selected from the group consisting of chlorine and fluorine, and $m$ and $n$ are integers of from 1 to 3, inclusive, $m$ and $n$ always being unity when identical in value; and further provided that when $R_1$, $R_2$, $R_3$ and $R_4$ are hydrogen and X is oxygen, then $m$ is 1 and $n$ is 1 or 2.

2. A compound of the formula:

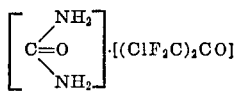

3. A compound of the formula:

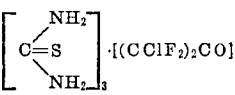

4. A compound of the formula:

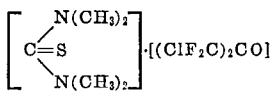

5. A compound of the formula:

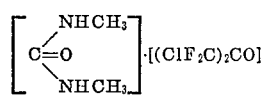

6. A compound of the formula:

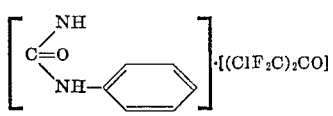

7. A compound of the formula:

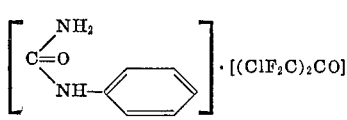

8. A compound of the formula:

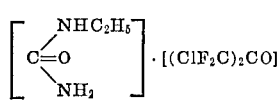

9. A compound of the formula:

10. A compound of the formula:

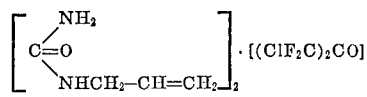

11. A compound of the formula:

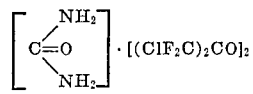

12. A compound of the formula:

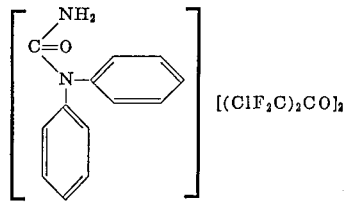

13. A compound of the formula:

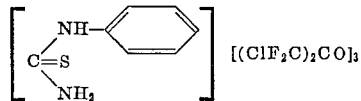

14. A compound of the formula:

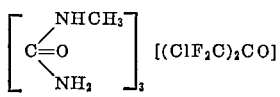

15. A compound of the formula:

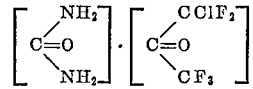

16. A compound of the formula:

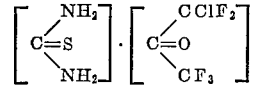

17. A compound of the formula:

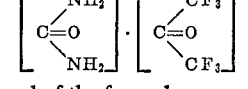

18. A compound of the formula:

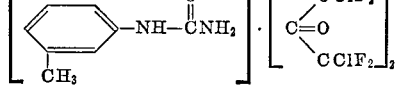

19. A compound of the formula:

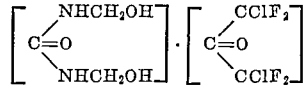

References Cited

Allied Chemical Product Data Sheet on Sym-Dichlorotetrafluoroacetone, November 1962, page 2.

HENRY R. JILES, Primary Examiner

U.S. Cl. X.R.

71—92, 99, 118, 119, 120